May 7, 1946. T. R. JONES 2,399,808
AUTOMATIC ALIGNING AND LOCKING TOOL HOLDER
Filed Aug. 19, 1943
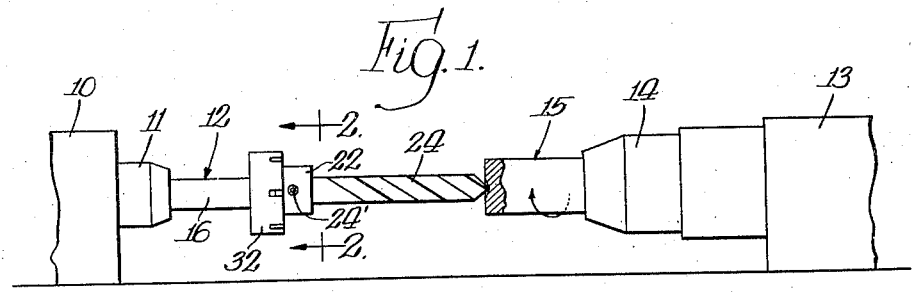
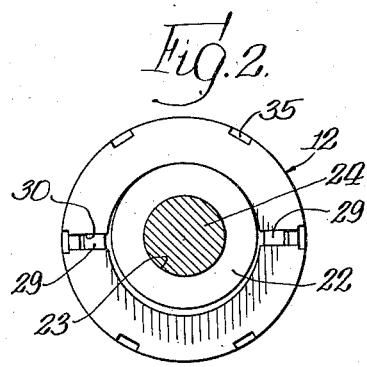
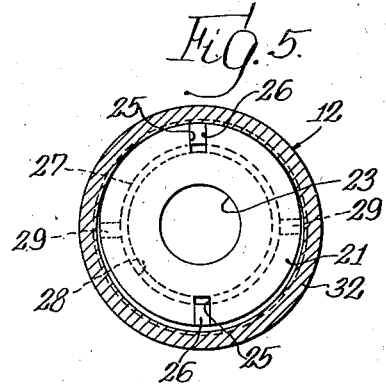
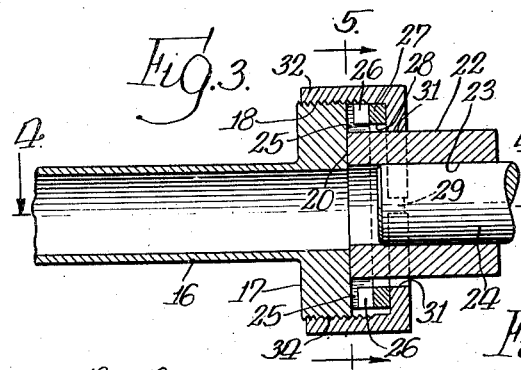
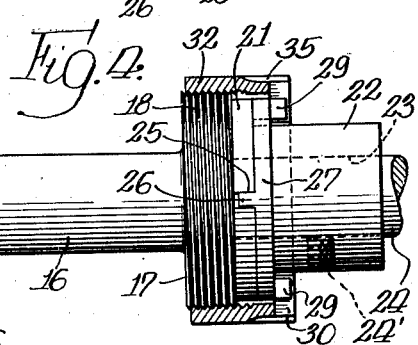
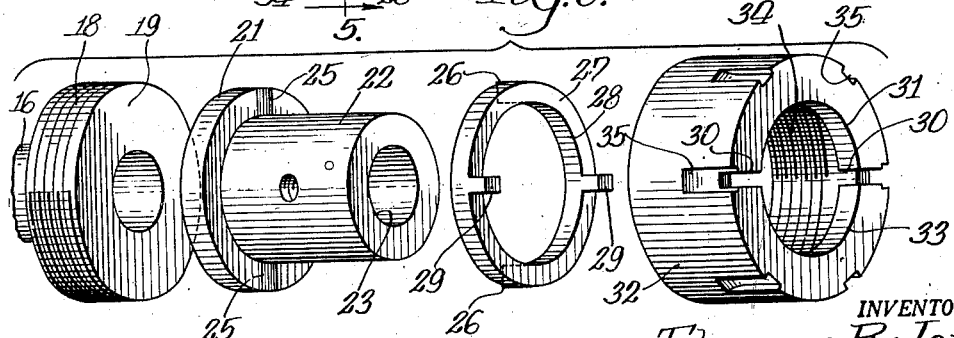
INVENTOR.
Thomas R. Jones,
BY John P. Smith
Atty.

Patented May 7, 1946

2,399,808

UNITED STATES PATENT OFFICE 2,399,808

AUTOMATIC ALIGNING AND LOCKING TOOLHOLDER

Thomas R. Jones, Chicago, Ill.

Application August 19, 1943, Serial No. 499,292

5 Claims. (Cl. 77—60)

The present invention relates generally to tool holders, but more particularly to a novel and improved type of tool holder which automatically aligns the tool supported therein with respect to the work or stock and simultaneously or subsequently automatically locks the tool in aligned position with the work.

A further object of the invention is to provide a novel and improved as well as compact tool holder which is adapted to be mounted on or secured to the dead spindle or tool post of a turret slide in an automatic screw machine, or similar device, and having means associated therewith for maintaining the tool in parallelism with the dead and live spindles of the machine, while at the same time automatically aligning the tool in axial alignment with the work and simultaneously locking or rigidly securing the tool in the tool holder after its proper alignment has been obtained.

A still further object of the invention is to provide a novel and improved tool holder which is self-aligning and self-locking and which at the same time, secures the accuracy and efficiency so essential to the production necessary in the use of automatic screw machines of the multiple spindle type.

These and other objects are accomplished by providing a construction and an arrangement of the various parts in the manner hereinafter described and particularly pointed out in the appended claims.

Referring to the drawing:

Fig. 1 is a diagrammatic view of a portion of a turret lathe having my improved tool holder mounted thereon;

Fig. 2 is an enlarged cross sectional view taken on the line 2—2 in Fig. 1;

Fig. 3 is a longitudinal cross sectional view of my improved tool holder;

Fig. 4 is a cross sectional view taken on the line 4—4 in Fig. 3;

Fig. 5 is a cross sectional view taken on the line 5—5 in Fig. 3; and

Fig. 6 is an enlarged perspective view of separate parts showing the manner in which they are assembled.

In illustrating one form of my invention, I have shown the same in connection with a turret lathe or similar machine, a fragmentary portion of which is diagrammatically shown in Fig. 1 of the drawing. The lathe or screw machine in this illustration comprises a turret slide 10 which is mounted on and longitudinally adjustable with respect to the bed of the lathe or screw machine in the manner well understood in the art. Supported in the turret slide 10 is a tool post 11 which in effect is the dead spindle of the machine. This tool post rigidly supports therein my improved automatically aligning and automatically locking tool holder generally indicated by the reference character 12. The other portion of the turret lathe includes a live spindle bearing, generally indicated by the reference character 13, in which is revolvably mounted a chuck or live spindle 14. Supported in the chuck or live spindle 14 in a manner well understood in the art, is the material being worked on or stock indicated by the reference character 15.

My improved tool holder comprises a relatively stationary main tubular member 16, one end of which is adapted to be mounted in and supported by a dead spindle or tool post 11 of the turret slide 10 in the manner well understood in the art and diagrammatically illustrated in Fig. 1 of the drawing. The other end of the main member 16 is provided with a circular flange 17 which has its outer periphery, as shown at 18, threaded. The outer face of the flange 17 is provided with a smooth surface as shown at 19 which is adapted to contact a smooth surface 20 of a circular flange 21 formed on one end of a relatively movable tool holding member 22. The tool holding member 22 has a longitudinally extending bore 23 for receiving and supporting therein a tool such as a reamer, drill, or the like, as shown at 24. The tool is rigidly secured in position in the tool holder member 22 by a set screw which is adapted to be mounted in a threaded bore 24' formed in the side or barrel portion of the member 22. Formed on one side of the flange 21 of the tool holder member 22 are parallel or radially projecting recesses 25 which are adapted to slidably receive complementary and oppositely disposed lugs 26 formed on one side of a drive washer or ring 27. The washer or ring 27 is provided with a central bore 28 which is adapted to loosely embrace the outer surface or sleeve of the tool holder member 22. Located on the face opposite the lugs 26 of the ring 27 and arranged at right angles with respect thereto, are two oppositely disposed and laterally projecting lugs 29 which are adapted to engage and be complementary to oppositely disposed recesses 30 formed on an internal flange 31 of a coupling member 32. The flange 31 of the coupling member 32 has an axial bore as shown at 33 of a diameter substantially larger than the outer or barrel portion of the tool holder member 22 so as to permit axial or lateral displacement of the tool holder member in a radial direction with respect to the coupling members 32 and the main member 16 of the tool holder proper. The coupling member 32 has an internally threaded portion, as shown at 34, for engaging in threaded engagement therewith, the threaded portion 18 of the flange 17 of the main member 16. The periphery of the coupling member 32 is provided with equally spaced apart wrench engaging recesses 35 to facilitate the disengagement of the coupling member from the main member 16 of the tool holder.

From the above description it will be obvious that the tool 24 and tool holder member 22 are normally held stationary, but are relatively movable with respect to the main member 16 and coupling member 32 during the automatic action or operation of aligning the tool 24 with the stock 16 and live spindle 14.

Summarizing the advantages and functions of operation of my improved automatically aligning and automatically locking tool holder, let us assume that the tool is secured in the tool holder member 22 in the manner shown in Fig. 1 of the drawings and the tool holder is mounted on the dead spindle or tool post 11 of the turret slide 10 with the coupling member 32 thereof mounted in threaded engagement with the main member 16. Let us further assume that the coupling member 32 is adjusted with respect to the main member 16 so that the tool holder member 22 together with the tool 24 is capable of floating or free lateral movement with respect to the dead spindle. In this connection it will be noted that the ring 27 with its oppositely arranged lugs 26 and 29 engaging the complementary slots in the flanges 21 and 31 of the respective members 22 and 32, maintains the clutching of the parts together. When the slide 10 is next moved in a direction to have the tool 24 engage the revolving work or stock 15, the tool will automatically move into alignment with the live spindle and work. As this action is occurring, the tool will simultaneously and slightly revolve in a direction indicated by the arrow in Fig. 1 of the drawings to thereby tighten or turn the coupling member 32 on and with respect to the main member 16 to lock or rigidly clamp the tool holder member 22 between these two parts. To state it in other words, the revolving of the live spindle and the work contacting the tool automatically shifts the longitudinal axis of the tool into alignment with the longitudinal axis of the live spindle and subsequently and automatically locks or rigidly secures the tool and tool holder member in this aligned position. This automatic action of aligning and locking the tool by the movement of the revolving action of the stock on the live spindle occurs at the time the tool is brought into contact with the work. It will, of course, be understood that on each occasion a new piece of material or stock is placed upon the live spindle, the coupling member must be loosened with respect to the main member so that the tool holder member may shift in its function of aligning the tool with the work.

From the above description it will be readily seen that I have not only provided a simple, compact and improved type of tool holder, but one in which considerable time and labor is saved, since the tool holder provides the means whereby the tool is automatically aligned with the live spindle and work, and simultaneously locked in this position, all of which eliminates the tedious job of repeatedly testing and adjusting to secure proper alignment of the tool with the live spindle.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. The combination with a machine having a live spindle and a dead spindle, stock to be worked upon carried by said live spindle, a tool holder carried by said dead spindle comprising a main member, a tool holder member carried by said main member and laterally displaceable with respect thereto, a tool mounted in said tool holder member, a coupling member mounted in threaded engagement with said main member and embracing said tool holder member, a driving ring for clutching said tool holder member with said coupling member whereby upon the engagement of said tool with said stock, said tool holder is actuated to automatically align said tool with said live spindle and automatically lock said tool in said holder in aligned position.

2. The combination with a machine having a live spindle and a dead spindle, stock to be worked upon carried by said live spindle, a tool holder carried by said dead spindle comprising a main member, a tool holder member carried by said main member and laterally displaceable with respect thereto, a tool mounted in said tool holder member, a coupling member mounted in threaded engagement with said member and embracing said tool holder member, a driving ring having diametral lugs on the opposite faces thereof and engageable with complementary recesses formed in said tool holder member and said coupling member whereby upon engagement of said tool with said stock, said tool holder is actuated to automatically align said tool with said live spindle and automatically lock said tool in said holder in aligned position.

3. An automatically aligning and locking tool holder comprising a relatively stationary main member, a bodily and relatively movable tool holder member, a coupling member operatively connecting said first named members together, said tool holder member and said coupling member having diametrally disposed recesses formed therein, a ring mounted between said tool holder member and said coupling member, and diametrally disposed lugs formed on the opposite faces of said ring and engageable with said recesses for operatively connecting said tool holder member with said coupling member.

4. An automatically aligning and locking tool holder comprising a relatively stationary main member, a bodily and relatively movable tool holder member, a coupling member for operatively connecting said members together, a ring positioned between said tool holder member and said coupling member, radially disposed lugs formed on the opposite faces of said ring, lugs on one face of said ring arranged at right angles to the lugs on the other face of said ring, said lugs being complementary to and engageable with recesses formed in said tool holder member and said coupling member.

5. An automatically aligning and locking tool holder comprising a relatively stationary main member, a bodily and relatively movable tool holder member, a coupling member for operatively connecting said first named members together, and a ring having lugs formed on the opposite faces thereof and engageable with complementary recesses formed in said tool holder member and said coupling member.

THOMAS R. JONES.